S. F. PIERCE.
TRIMMER FOR PASTRY CONES.
APPLICATION FILED JULY 1, 1910.
1,062,028.
Patented May 20, 1913.
3 SHEETS—SHEET 1.
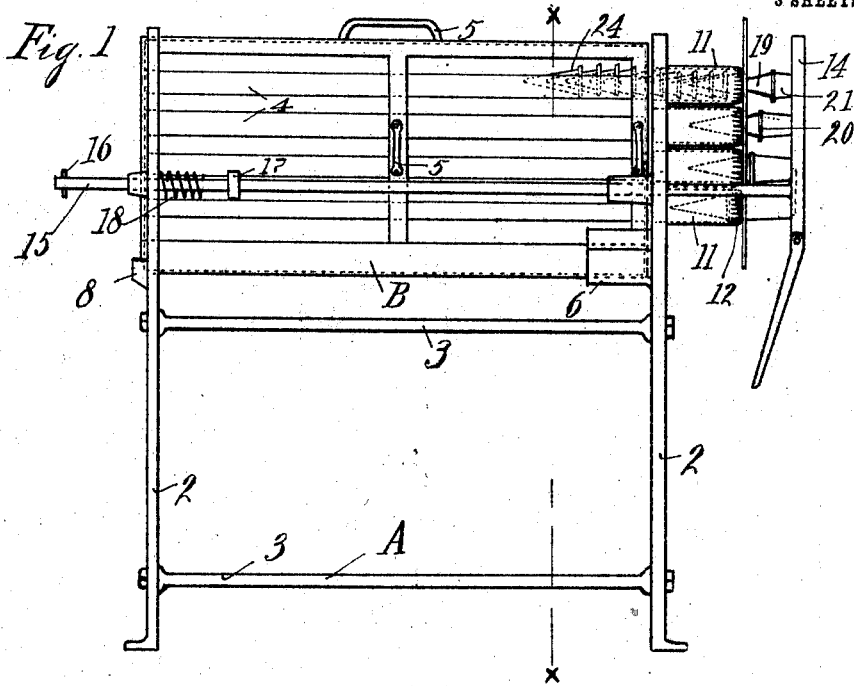
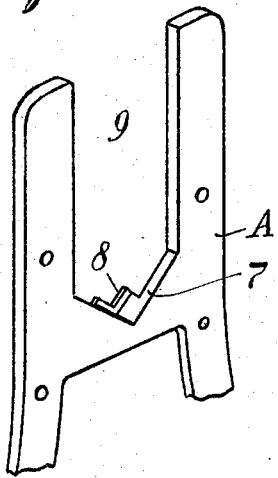
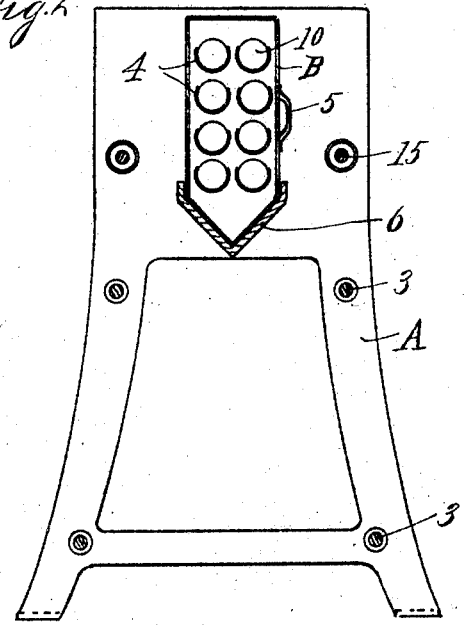
Witnesses,
George Voelker
H. Smith
Inventor,
Simeon F. Pierce
by Lothrop Johnson
his Attorneys.

S. F. PIERCE.
TRIMMER FOR PASTRY CONES.
APPLICATION FILED JULY 1, 1910.
1,062,028.
Patented May 20, 1913.
3 SHEETS—SHEET 2.
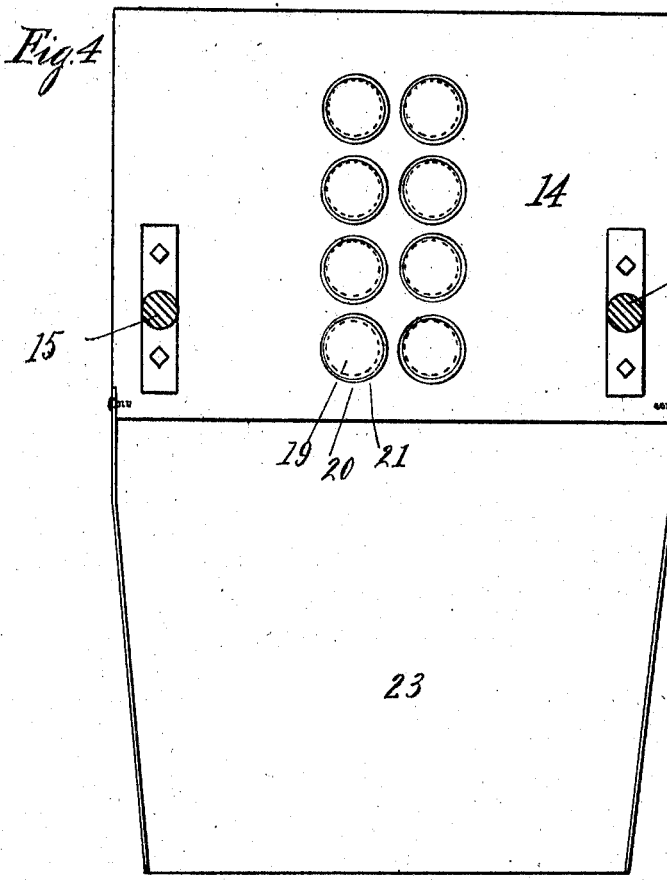
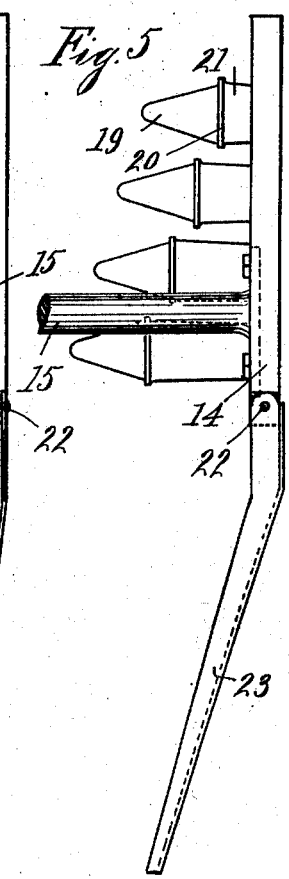
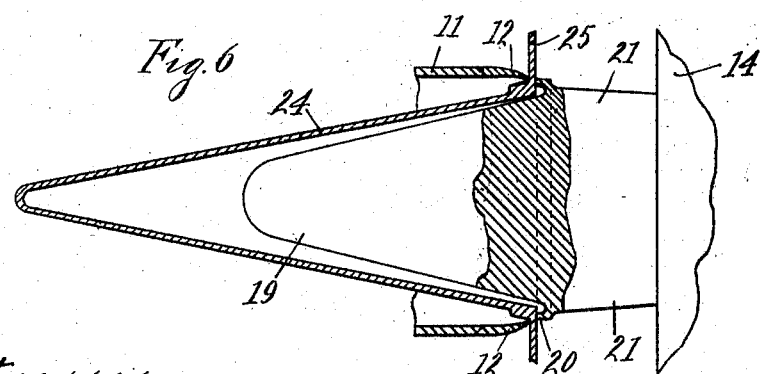
Witnesses,
George Voelker
H Smith
Inventor,
Simeon F. Pierce
by Lothrop & Johnson
his Attorneys S. F. PIERCE.
TRIMMER FOR PASTRY CONES.
APPLICATION FILED JULY 1, 1910.
1,062,028.
Patented May 20, 1913.
3 SHEETS—SHEET 3.
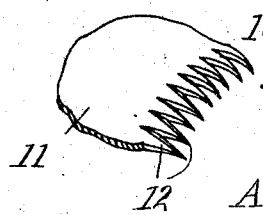
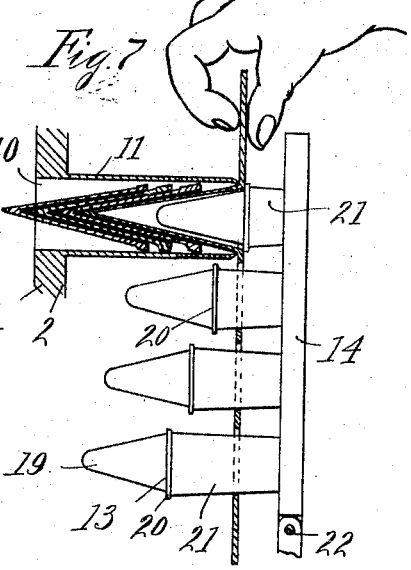
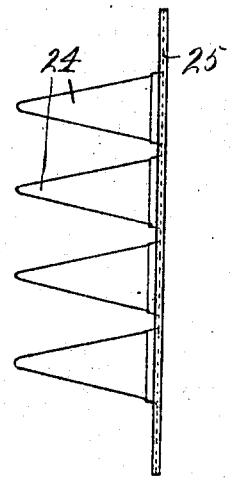
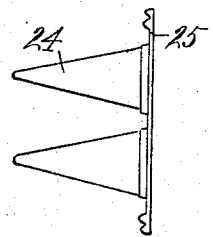
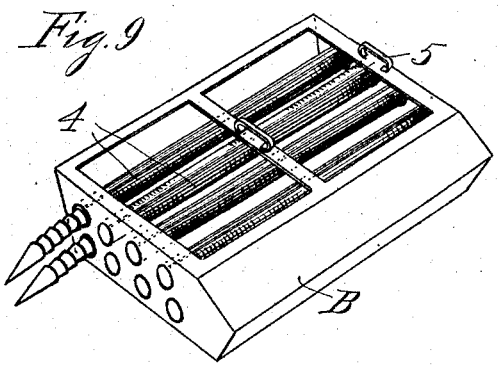
Witnesses,
George Voelker
A. Smith
Inventor,
Simeon F. Pierce
by Lothrop Johnson
his Attorneys

UNITED STATES PATENT OFFICE.

SIMEON F. PIERCE, OF ST. PAUL, MINNESOTA, ASSIGNOR, BY MESNE ASSIGNMENTS, TO CREAM CONE MACHINE COMPANY, OF ST. PAUL, MINNESOTA, A CORPORATION OF MINNESOTA.

TRIMMER FOR PASTRY CONES.

1,062,028.  Specification of Letters Patent.  Patented May 20, 1913.

Application filed July 1, 1910. Serial No. 569,959.

*To all whom it may concern:*

Be it known that I, SIMEON F. PIERCE, a citizen of the United States, residing at St. Paul, in the county of Ramsey and State of Minnesota, have invented certain new and useful Improvements in Trimmers for Pastry Cones, of which the following is a specification.

My invention relates to improvements in means for trimming pastry cones after the same have been cooked in the ordinary manner in a cone cooking machine, and consists in improved means whereby the cone may be rapidly and evenly trimmed without injury.

To this end the invention consists in the construction, combination and arrangement of parts hereinafter described and claimed.

In the accompanying drawings forming part of this specification, Figure 1 is a side elevation of my improved invention; Fig. 2 is a section on line $x$—$x$ of Fig. 1; Fig. 3 is a perspective view of a support forming part of my invention; Fig. 4 is an inside view of plunger mechanism forming part of the invention shown partly in section; Fig. 5 is a side elevation of the same; Fig. 6 is a side elevation shown partly in section of one of the plungers and coöperating trimming tube shown in position trimming a cone; Fig. 7 is a side elevation of the plungers showing one of the coöperating trimming tubes partly in section and in coöperating position; Fig. 8 is a detail view of a portion of the cutting edge of one of the trimming tubes; Fig. 9 is a perspective view of a cone holder forming part of my invention; Figs. 10 and 11 are side and end views, respectively, of a plurality of cones before being trimmed; and Fig. 12 is a perspective view of a sheet of pastry which connects the cones before they are trimmed, being shown after the operation of trimming and partly broken away.

In the drawings A represents the framework of the machine having interspaced front and rear walls 2 connected by suitable tie rods 3.

B represents a holder for receiving and holding the cones in the operation of the machine, the holder consisting preferably of skeleton framework provided with a plurality of longitudinally extending tubular troughs 4 and carrying a suitable handle 5. The holder B is removably supported by means of a bed 6 upon the inner side of the front wall of the framework A and a coöperating bed plate 7 upon the outer side of the rear wall of the framework A, the bed plate 7 being formed with a lug 8 within which the adjacent end of the holder is adapted to fit. The bed plate 7 and adjacent end wall of the frame A is formed with a vertical opening 9 to receive the end of the holder. The bottom of the holder and supports 6 and 7 are preferably tapered as shown. The front wall 2 of the frame A is formed with a plurality of openings 10 registering with the troughs 4 when the holder is in position, the openings 10 being preferably somewhat larger than the troughs 4 and surrounding the openings 10 and projecting outwardly from the front wall 2 of the machine is a plurality of tubes 11, gradually contracted toward their outer ends and having their free ends formed with a plurality of teeth 12. The teeth 12 as shown in Fig. 8 are peculiarly shaped, being bent inwardly toward their free ends and beveled upon their outer edges as shown.

Arranged to coöperate with the trimming tubes 11 is a plurality of plungers 13 projecting inwardly from a plate 14, which plate has slidable support through the medium of rods 15 extending slidably through the front and rear wall of the machine. The rods 15 are provided at their rear ends with pins 16 limiting their forward movement and carry inside the rear wall of the machine nuts 17, between which and the rear wall of the machine, are interposed coil springs 18 surrounding the rod and acting as buffers as hereinafter more specifically set forth. The plungers 13 are of gradually decreasing length from the lower to the upper plungers. Each plunger is formed with a cone shaped free end 19 separated by a surrounding rim 20 from a stub portion 21 which stub portion is gradually tapered toward the plate 14. The plate 14 is supported to carry the free ends of the plungers into the tubes in the operation of the machine. Having hinge support 22 upon the bottom of the plate 14 is an inwardly directed apron 23 for guiding the cuttings into a suitable receptacle, not shown. In Figs. 10 to 12 is shown a plurality of cones 24 as they come from the cooking machine. In this condition they the connected at their open ends by a sheet 25 of pastry.

In operation, with a cone holder in position in the machine a sheet of cooked cones will be placed upon the ends of the trimming tubes with the cones projecting into the tubes. The plates 14 will be drawn inward through the medium of the rods 15 until the tapered ends of the longest plungers enter the corresponding cones as shown in Fig. 6. The continued movement of the plate 14 will successively carry the progressively shorter plungers into the tubes shearing off the pastry around each cone as it is carried inward past the cutting edge of the tube. The tubes being contracted toward their free ends and having the teeth of the inbent and peculiar shape shown will cause the pastry as it is sheared away from the cone to be spread by the tube in the inward travel of the plungers. This will tend to break up the pastry being sheared off, allowing it to drop downward against the apron. Any pastry not thus broken up will slide back upon the tapered spindles of the plungers and be broken by later movements of the plate and plungers. The spring 18 forms a resilient bumper saving the plate 14 from injurious pressure against the cutting edges of the tubes. The machine is actuated in a similar manner with successive sheets of the baked cones until the holder is filled, when the holder will be removed from the machine and the cones allowed to slide therefrom into the proper receptacles. The centers of the tubes are preferably more widely interspaced than the centers of the baked cones so that after the lower cone has been sheared off and forced into the tube the next one will be slightly raised as the next plunger passes into the tube. This assists in preventing breaking of the very brittle cones in the operation of the machine.

When the sheet of cooked cones is removed from the cooking machine before being placed in my trimmer there is naturally more or less uneven shrinking of the pastry connecting the cones. This results in the different cones supported by the connecting sheet of pastry being more or less unevenly interspaced. This is compensated for and the cones kept from being cracked by the coöperation of the tapered plungers; by having the plungers of progressively increasing length, and by having them formed with outwardly tapered spindles. The tapered free ends of the spindles successively center the cones in the cutting tubes, the longer plungers first trimming the first row of cones without bringing any strain upon the remaining cones and the tapered spindles allowing freedom of movement of the sheared off material as it passes over the larger diameter of the plungers and permitting the sheared off material to be more easily freed and to drop therefrom.

I claim as my invention:

1. In a machine of the class described, a plurality of open ended tubes, each tube being formed at its outer end with a plurality of teeth, said teeth being directed laterally into the central opening of the tube to form a smaller area than the interior of the tube, whereby to spread and break up any surrounding material into which the tube may be forced, and a plurality of plungers supported in coöperation with the cutting ends of said tubes, said plungers being formed with supporting shanks tapered away from the ends of said tubes for the purpose set forth.

2. In a trimmer for pastry cones, the combination with a plurality of open ended tubes, of toothed cutting edges carried by the outer ends of said tubes, means for centering pastry cones in the outer ends of said tubes and forcing them through said tubes comprising a plurality of slidable plungers of progressively increasing length having tapered ends arranged to enter the outer ends of said tubes and each plunger carrying a contacting stop for the pastry cone adjacent to the inner portion of the tapered end of the plunger.

3. In a trimmer for pastry cones, the combination with a plurality of open ended tubes, of toothed cutting edges carried by the outer ends of said tubes, and a plurality of plungers of progressively increasing length slidably supported in connection with the outer ends of said tubes, each plunger being formed with an outwardly tapered free end, and an inwardly tapered spindle for the purpose set forth.

In testimony whereof I affix my signature in presence of two witnesses.

SIMEON F. PIERCE.

Witnesses:
H. S. JOHNSON,
H. SMITH.